Figure 1:
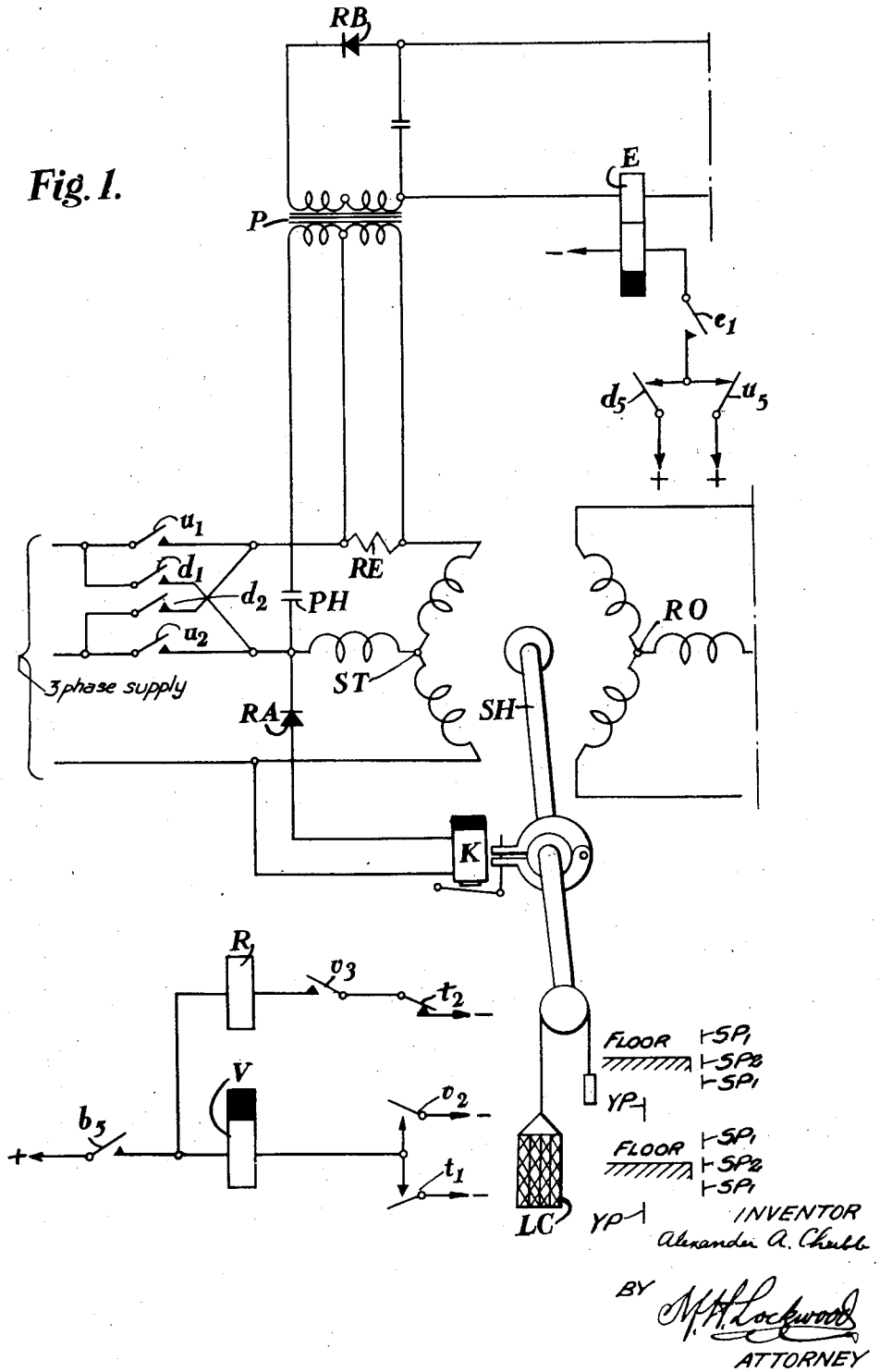

May 17, 1938. A. A. CHUBB 2,117,839
SYSTEM OF CONTROL FOR ELECTRICALLY OPERATED LIFTS
Filed April 24, 1936 4 Sheets-Sheet 4

Patented May 17, 1938

2,117,839

UNITED STATES PATENT OFFICE 2,117,839

SYSTEM OF CONTROL FOR ELECTRICALLY OPERATED LIFTS

Alexander Albert Chubb, Coventry, England, assignor to The General Electric Company Limited, London, England Application April 24, 1936, Serial No. 76,115
In Great Britain May 1, 1935

9 Claims. (Cl. 172—152)

My invention relates to systems of control for electrically operated lifts, and has for its object the provision of means whereby a lift may be brought to rest accurately at a floor, and independently of the load carried by it.

The load in a lift may vary considerably, and if on approaching a floor at which it is required to stop, a brake having a constant retarding effect is applied, then if the load is such as to help the motor driving the lift, the lift will overshoot the floor level. Conversely, if the load hinders the driving means, the lift will cease to move before it reaches the required floor.

It is, of course, known to provide means whereby this effect may be avoided. The means usually include some method of weighing the actual load in the lift, and then using this result to control the speed of the lift driving motor either during acceleration or deceleration or both. This method is applicable only to lifts in which control of the motor speed is by means of a variable voltage applied to the armature of the driving motor, such systems of control being relatively expensive.

According to my invention, in a system of control for an electrically operated lift, means are provided whereby the load in the lift is measured during acceleration after starting from rest, whereafter the lift is brought to rest at a required position by causing the driving motor during acceleration to be energized in a reverse direction, the extent of such energization being determined by the load measuring device.

In an embodiment of my invention, a current which is proportional both to the steady voltage across one phase of a 3-phase supply to an inductor motor and also to the current in one phase of the said supply, flows through a resistance controlling current to a lift load relay. When the lift starts from rest, a step-by-step wiper switch having a contact bank connected to tappings on the load relay resistance commences to move its wipers over this contact bank, the load relay being connected in circuit with the wiper moving over the resistance tappings is slowly energized as the resistance is decreased and when the current through the load relay reaches a particular value the relay operates and through its contact opens the switch stepping circuit and stops the switch from stepping.

Nothing further happens until the lift is required to stop and then only after cutting out manual control and, when an inductor plate is passed at some distance prior to the required floor. When the lift passes this inductor plate the latter operates a relay which first inserts in the rotor circuit by means of slip rings a value of resistance determined by the position of the load measuring wiper switch. The relay thus operated then reverses the connections to two of the phase leads to the stator thus causing the lift motor to act as a brake and retard the carriage with a force proportional to the load in the lift. The resistance inserted in the rotor circuit is adjusted during acceleration so that the lift is brought to rest substantially at the required floor independently of the load carried, whereon a holding brake of known type is applied and the lift held at the required floor.

The invention may of course, be applied to a lift driven by a D. C. motor in which case operation of the inductor relay causes reversal of the armature connections and the insertion in the armature circuit of a resistance having a value proportional to the load carried by the lift at that instant.

Figure 1A:
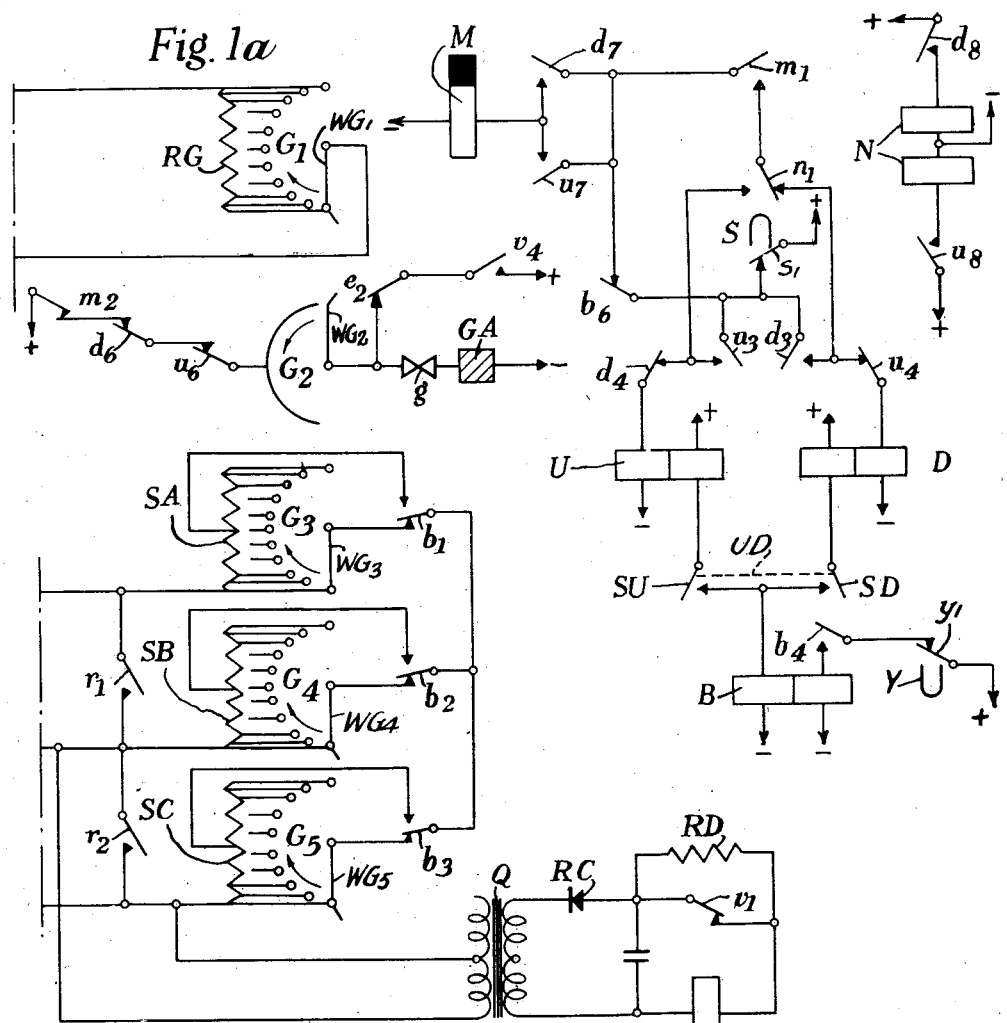
Figure 2:
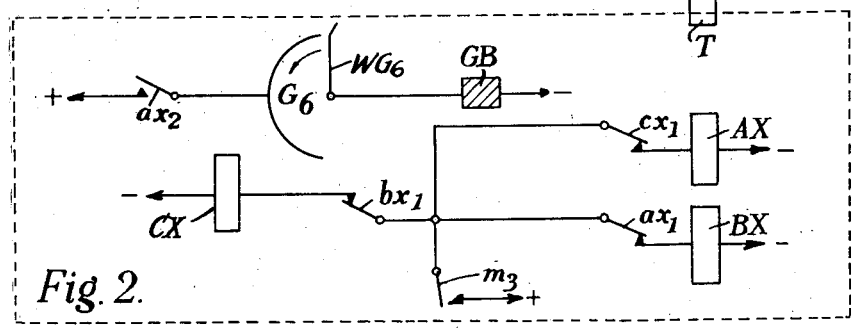
Figure 3:
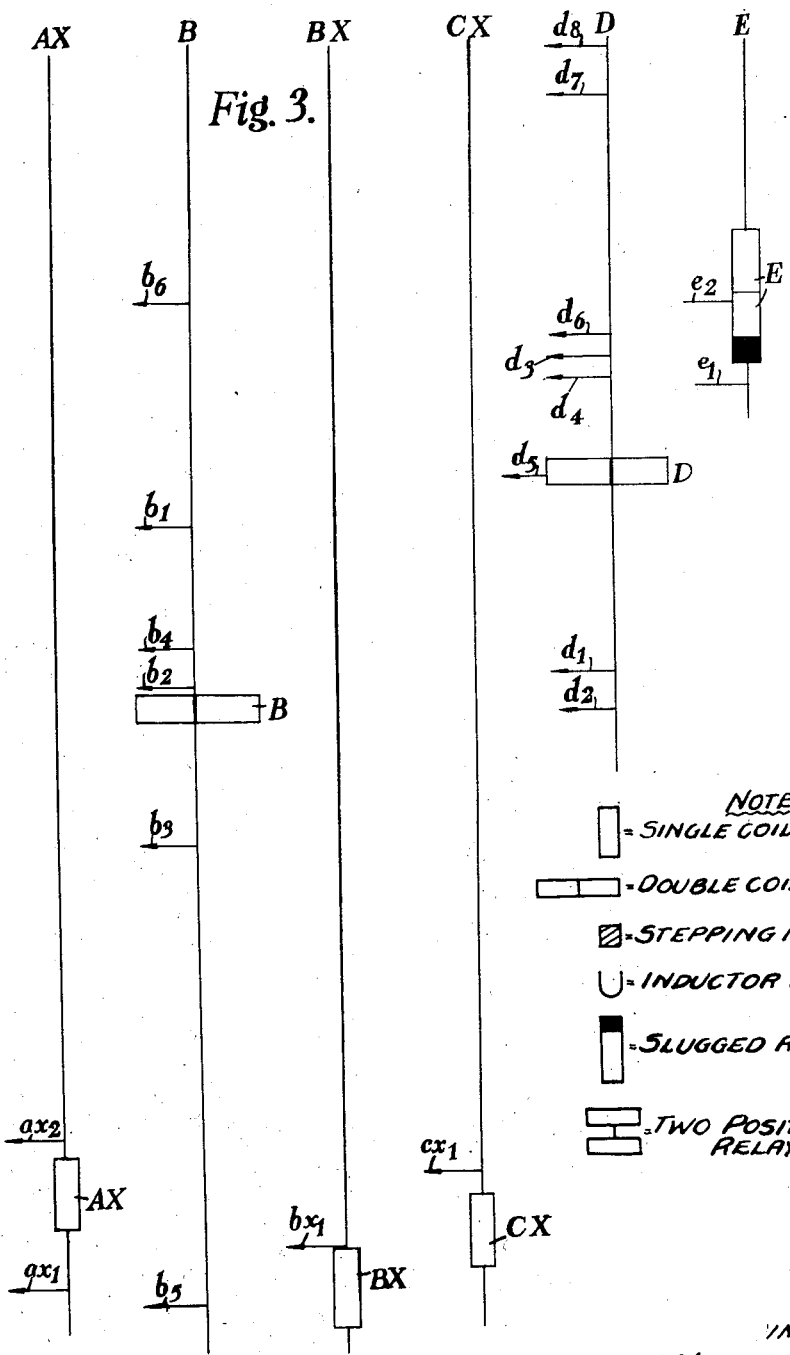
Figure 3A:
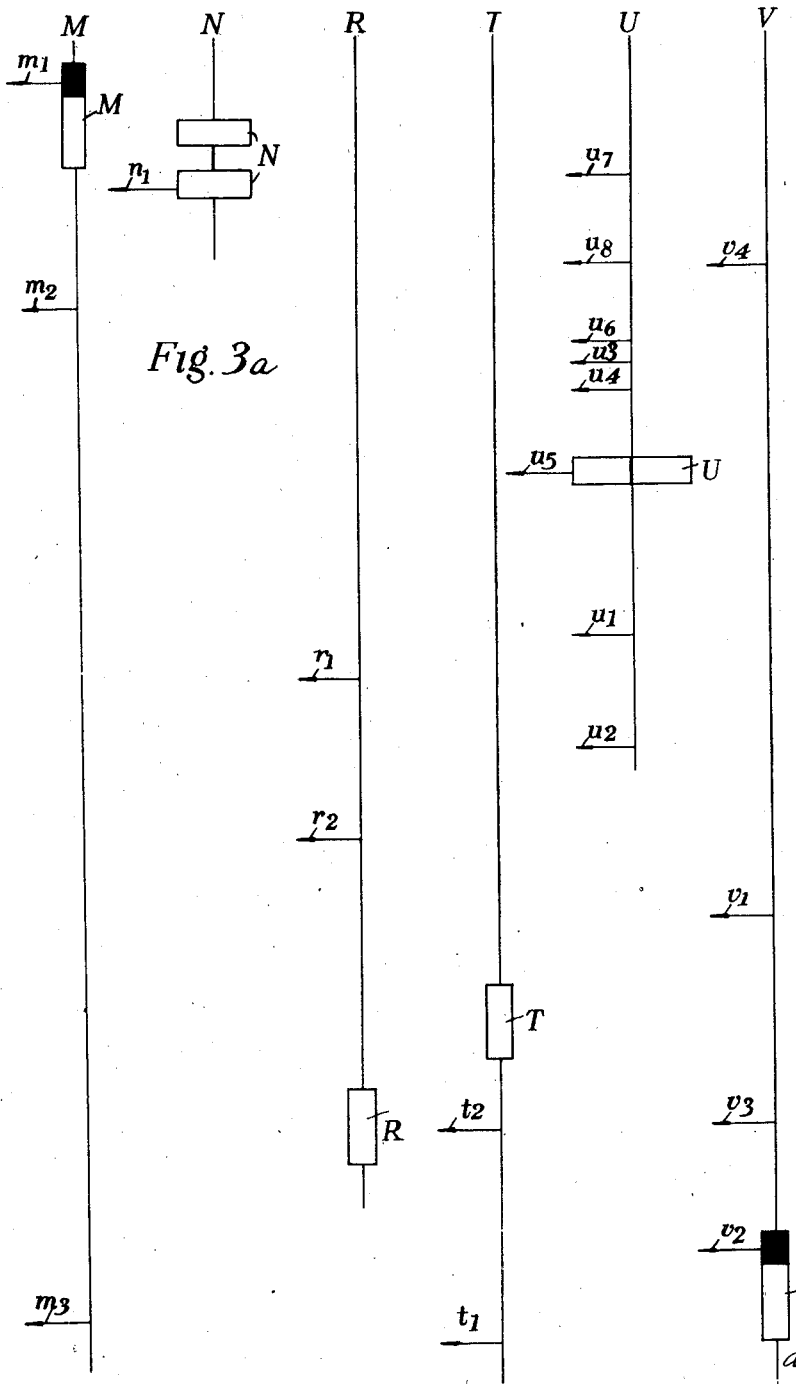

Reference should now be made to the accompanying drawings Figures 1 and 1a of which show an embodiment of my invention, and Figure 2 is a modification providing graduated braking. Figure 1 is a so-called "divorced contact" drawing and to assist in understanding it reference should be had to Figures 3 and 3a which are a "code sheet" for the Figures 1 and 1a.

Referring to Figure 1, it will be seen that as illustrated the lift driving motor is an induction motor which consists of a rotor RO fixed to a shaft SH and the latter carries other devices referred to later. The rotor RO is driven by the stator windings ST connected through suitable switching devices (contacts $u_1$, $u_2$, $d_1$, $d_2$) to a three-phase supply as shown. The rotor currents are preferably controlled by means of tapped resistances SA, SB and SC, the values of these resistances being determined by the associated switch banks G3, G4, G5 and the cooperating wipers, and by the relay contacts ($b_1$, $b_2$, $b_3$) connected thereto as explained later.

When the lift is stationary, a holding brake K is de-energized, and clamps the lift driving shaft solidly. When current is supplied to the motor and during movement of the lift away from the floor this holding brake is energized and by operating releases the driving shaft allowing the carriage LC to move in the lift well. During deceleration of the motor the speed of the carriage is reduced by reversing the stator connections ($u_1$, $u_2$, $d_1$, $d_2$) so as to reverse the direction of the current, and then the carriage is finally brought to a standstill by release of the holding brake K when the motor circuit is cut as the lift reaches the floor. A typical traverse of the lift will now be described so that the operation of the system may be made manifest.

Assuming that the lift is at the bottom of the shaft and it is required to travel to an upper floor, the manual control up key SU is closed. This key is manually operated, and is held closed until some distance before the required floor is reached. The up key SU is mechanically interlocked with the corresponding down control key SD, closure of which causes the lift to travel downwards, so that only one key can be operated at a time.

Closure of the up key SU causes a control relay B and the up relay U to operate. Their contacts perform the following functions:—

$b_1$, $b_2$ and $b_3$ moving to their upper positions adjust the values of resistances SA, SB and SC for starting the driving motor.

$b_4$ by closing locks relay B operated to the contact of the floor relay Y (see later).

$b_5$ closing prepares an operating path for a resistance relay R and a switch starting relay V.

$u_1$ and $u_2$ close circuits for the stator windings ST so as to operate the motor to drive the lift in an upward direction.

$u_3$ closing locks up relay U operated to the contact of stop relay S (see later).

$u_4$ by opening prevents false operation of down relay D.

$u_5$ closing prepares a locking circuit for load relay E.

$u_6$ opening breaks a self-interrupting circuit for the switch stepping magnet GA, used later for restoring the wipers.

$u_7$ closing prepares to operate reversing relay M later.

$u_8$ closing operates a two position relay N to a position suitable for deceleration (see later). This relay is of the two-position type, its contact $n_1$ remaining in the position to which it was last moved until energized to a fresh position.

Two actions now take place simultaneously. Large currents flow in the rotor windings (if the lift load is an opposing one), these currents passing through (by way of contacts $b_1$, $b_2$, $b_3$) the starting resistances (, the lower sections of) SA, SB and SC, and being limited by them. In addition, in view of circuit connections across two phases of the rotor circuit a potential appears across the primary of the rotor circuit transformer Q, this potential being rectified by the rectifier RC and thereafter operating an initiating relay T via a resistance short circuiting contact $v_1$.

$t_1$ closing operates switch starting relay V to positive on $b_5$ now closed.

$t_2$ by opening prevents operation of resistance relay R when contact $v_3$ closes.

$v_1$ opening removes the short circuit across the resistance RD thereby reducing the current through relay T, though this initiating relay does not release at the moment.

$v_2$ closes a holding circuit which locks switch starting relay V operated.

$v_4$ closes a self-interrupting circuit of the switch stepping magnet GA through contacts $e_2$ and $g$. The switch commences to step the wipers G1—G6 rapidly over their associated contact banks in the direction of the arrows.

In the meantime, the primary of a potential-current transformer P is traversed by two currents. One of them is of constant magnitude (potential) and is derived from two of the phase leads through the phase correcting condenser PH. The other current in the primary is proportional to the current flowing through the resistance RE, in the stator circuit, this current accordingly being proportional to this load in the lift. If this load is a heavy opposing one, a large starting current flows through the resistance RE, the resulting constant potential current flowing in the second half of the primary of the transformer P being in phase with and therefore helping the current flowing in the first half of the primary. If on the other hand, the load in the lift is a helping one, the starting current through the resistance RE may be small or even negative, i. e. it may be 180° displaced from the phase of the current in the first half of the primary. Whatever the starting current, a potential proportional thereto is induced in the secondary of the transformer P, this potential being rectified by the rectifier RB, and applied via the wiper of the switch contact bank G1 through the tapped resistance RG to one coil of the load relay E.

As will be remembered, the wiper G1 along with the other switch wipers is being stepped by the stepping magnet GA over the contacts associated with it, these contacts being connected in such fashion to the tapped resistance RG as rapidly to reduce the value of the resistance in series with the load relay E. This permits an increase of the current passing through the coil of the load relay until it operates, the point at which such operation takes place being determined by the potential derived from the secondary of the transformer P, and hence from the current in the stator leads, this current being determined by the load in the lift. When the load relay E operates, its contact $e_1$ closes a holding circuit which locks the relay operated to contact $u_5$, and contact $e_2$ opens the self-interrupting circuit of stepping magnet GA so that the wipers of the switch cease to step. It may therefore be said that the wipers of the stepping switch GA have now been positioned at a point corresponding to the load in the lift.

Reverting now to the rotor circuit, when the potential derived from transformer Q falls, after the initial heavy current flow at starting to such a value that the current through the resistance RD and relay T is insufficient to maintain the latter operated, relay T releases, and its contact $t_2$ by closing operates resistance relay R, $v_3$ being closed. The contacts $r_1$ and $r_2$ of resistance relay R short circuit resistances SA, SB and SC, and the rotor runs up to full speed, driving the lift in the shaft.

Nothing further happens until the lift reaches a point some distance ahead of the floor at which stopping is required. The manual control key SU is then opened. At a predetermined distance ahead of each floor, two inductor plates (not shown) are provided in the shaft of the lift, these plates co-operating respectively with the inductor relays floor relay Y and stop relay S. When the lift, in approaching the floor at which it is to stop, passes one of the said inductor plates floor relay Y is first momentarily operated, opening its contact. Since relay B can now no longer be held operated in series with up relay U, (SU being open), it is released by the opening of the contact of the floor relay U, the contact $b_4$ of control relay B, now open, preventing re-operation when the inductor floor relay contacts reclose.

$b_1$, $b_2$ and $b_3$ dropping to the lower contacts prepare circuits through the resistances SA, SB and SC of values such that the currents permitted by them to flow in the rotor circuit are commensurable with the load in the lift, i. e. if the load is large, the rotor currents will also be large, whereas if the load is small or helping, the rotor currents will be small.

$b_5$ opening releases resistance relay R and starting V.

$b_6$ closing operates reversing relay M via contact $u_7$ from positive on the contact of stop relay S.

Stop relay S is now momentarily operated by the second inductor plate (not shown), its contact releasing the up relay U. The reversing relay M does not release at the moment, for as indicated it is slugged.

$u_1$ and $u_2$ opening de-energize the motor stator ST. The brake K is not re-applied at this point as it is given a slight time lag.

$u_3$ opening cuts the holding circuit and prevents re-operation of the up relay U.

$u_4$ closing prepares an operating path for operation of down relay D.

$u_5$ opens the circuit of load relay E, which being slugged, does not yet release.

$u_7$ opens the circuit of reversing relay M, but this relay, being slugged, does not yet release.

When stop relay S releases after passing its inductor plate and before reaching the floor, its contact by closing now operates down relay D via $b_6$, $m_1$, $n_1$ and $u_4$.

$d_1$ and $d_2$ now close the stator circuits in a direction the reverse of that previously employed for driving the lift.

$d_5$ closed holds load relay E operated.

$d_7$ closed holds reversing relay M operated.

The lift now commences to slow down, its rate of deceleration being governed by the setting of the wipers G3, G4 and G5, this setting being, as previously described, controlled by the lift load.

When the lift reaches the desired floor, the inductor stop relay S is again operated from a further plate at the floor (not shown) in the shaft, and the opening of its contact releases down relay D and reversing M.

$d_1$ and $d_2$ opening break the circuits of the stator ST, thereby deenergizing the motor and the holding brake magnet K. This brake, in releasing, clamps the motor shaft and stops the carriage.

$d_5$ releases load relay E.

$d_6$ and $m_2$ by closing restore a self-interrupting path for the switch stepping magnet GA via the interruptor contact $g$ and bank G2. The switch now steps by self-interruption to the first contact and there stops.

All apparatus is now restored to a normal de-energized condition and is ready for a further traverse.

From the foregoing, it will be seen that the lift is run into a floor under the combined effect of two forces. These are due to the load in the lift and the currents flowing in the rotor circuit. Since the latter is varied automatically in opposition to the former after each time the lift starts from rest, accurate levelling under all conditions is ensured.

Figure 2 shows a modification whereby a more gradual deceleration may be obtained. The stepping switch GA with its several wipers is now provided with another stepping magnet GB, but this stepping magnet is adapted to drive the wipers G1 to G6 (G6 being added) in the direction opposite from that indicated by the arrows which indicate the stepping directions by stepping magnet GA. In addition, the further bank G6 is required, and three cycle relays AX, BX and CX. The action of this addition is as follows.

During the initial setting of the wipers of the switch by load relay E, the load relay E is now adjusted to operate after the wipers of the switch have moved rather farther than that previously described for Figure 1. Then when relay M operates as previously described at the commencement of the decelerational period, one of the cycle relays AX, BX or CX is operated by contact $m_3$. If relay AX operates, then $ax$ opening de-energizes relay BX.

$ax_2$ closing energizes the stepping magnet GB via bank G6.

$bx$ closed operates relay CX.

$cx_1$ opening releases relay AX.

$ax_1$ closing operates relay BX.

$ax_2$ opening de-energizes stepping magnet GB, and the wipers of the switch take a step backwards.

$bx_1$ opening releases relay CX.

$cx_1$ closing operates relay AX.

This cycle continues, the backward stepping of the wipers of the switch causing resistance to be cut out of the rotor circuit to thus gradually increase the braking effect on the lift.

When the latter is brought to rest at a floor, release of reversing relay M causes interruption of backward stepping, the wipers of the switch being restored to a normal position in the manner previously described.

Although a manually started lift has been described, it should be understood that the invention may easily be applied to an automatically started or stopped lift such as one operating on the so-called "collector" principle, the only differences being those necessary to replace the hand-operated control keys SU and SD by call storage and floor selecting relays and/or switches of known type.

Finally, although it has been stated that the switch G varies the rotor resistances SA, SB and SC directly through its contact banks, such a proceeding may not be advisable in the case of a lift taking large currents, in which case the switch wipers operate contactors of known type which perform the necessary resistance adjustment. Circuit modifications of this nature, being obvious to those skilled in the art, are omitted for purposes of clarity, though I wish it to be understood that the scope of my invention covers all such obvious adaptations not requiring the exercise of invention.

I claim:—

1. A system of lift control comprising a lift motor having stator and rotor coils, a source of current, circuits including up and down contacts for energizing the stator coils from said current source, starting resistances to be inserted in the circuits of the rotor coils during acceleration, deceleration resistances to be inserted in the circuits of the rotor coils during deceleration of the lift, tappings on said deceleration resistances cooperating with wipers of a step-by-step switch for adjusting the deceleration resistances according to the load in the lift, a stepping magnet for operating the wipers of said switch, a starting relay, starting relay contacts in the circuits of the rotor coils which when the starting relay is de-energized connect said deceleration resistances in the circuits of the rotor coils and when said relay is energized connect said starting resistances in said circuits of the rotor coils, up and down relays for operating the respective stator circuit contacts, up and down lift operating contactors for energizing the respective up and down relays one at a time and simultaneously energizing said starting relay, and relays and circuits controlled by the lift which, after the release of an operated operating contactor for deenergizing the operated up and down relay and thereafter deenergizing said starting relay so as to insert said deceleration resistances in the circuits of the rotor coils, are adapted for energizing the other of said up and down relays for reversing the direction of the current in the stator coils so as to utilize the braking effect of the motor according to the load in the lift in stopping the lift at a floor.

2. A system of lift control as in claim 1 wherein a relay operated by current derived from the circuits of the rotor coils is adapted to initiate operation of said stepping magnet for stepping the wipers of said switch during acceleration of the lift for adjusting the deceleration resistances according to the load in the lift to be inserted later in the circuits of the rotor coils when stopping the lift at a floor.

3. A system of lift control as in claim 1 wherein means controlled by the current derived from the circuits of the rotor coils after starting and during acceleration of the lift motor are provided for starting operation of the stepping magnet for stepping of the wipers of said switch for adjusting said deceleration resistances and a relay arranged to be operated by current derived from the circuits of the stator coils is provided for stopping operation of the stepping magnet when the wipers thereof have been stepped an amount determined by the load in the lift.

4. A system of lift control as in claim 1 wherein a relay adapted to be operated upon release of one of the up and down relays which has been operated is provided for operating the other up and down relay, that is, the down or up relay which will reverse the current in the stator coils.

5. A system of lift control as in claim 1 wherein a relay for operating a two position contact is arranged to be operated upon operation of one of the up and down relays to move said two position contact into position to effect operation of the other of said up and down relays during deceleration of the lift motor.

6. A system of lift control as in claim 1 wherein a relay arranged to be operated upon energization of the rotor coils is provided for starting the stepping of said switch wipers by the stepping magnet and another relay deriving current from the stator coils is adapted to stop the stepping of the wipers, the current for operating the last named relays being controlled according to the load in the lift by one of the wipers of said switch cooperating with the tappings of a resistance arranged to be inserted in said last named relay circuit.

7. A system of lift control as in claim 1 wherein an induction relay adapted to be operated as the lift arrives at or passes an inductor plate after an operated operating contactor has been released, is provided for deenergizing said starting relay so as to connect the adjusted deceleration resistances in the circuits of said rotor coils.

8. A system of lift control as in claim 1 wherein an induction relay adapted to be operated as the lift arrives at or passes an inductor plate after an operated operating contactor has been released, is provided for deenergizing an operated up or down relay and energizes the other relay, that is, the down or up relay that will reverse the current in the stator coils.

9. A system of lift control as in claim 1 wherein a second stepping magnet is provided for stepping the wipers of said switch counter to the direction of stepping by said first named stepping magnet and a cycle of relays and circuits is provided for operating said second stepping magnet for counter adjustment of the deceleration of the deceleration resistances during deceleration of the motor.

ALEXANDER ALBERT CHUBB.